(12) United States Patent
Tsukada et al.

(10) Patent No.: US 6,232,376 B1
(45) Date of Patent: May 15, 2001

(54) MOISTURE CURABLE POLYOLEFIN COMPOSITIONS

(75) Inventors: Kiroku Tsukada; Makoto Okazawa; Ariyoshi Ohki; Hirofumi Yasuda; Yasuo Nomura, all of Yokohama; Koji Ishihara, Tokyo, all of (JP)

(73) Assignee: Nippon Unicar Company Ltd., Tokyo (JP)

( * ) Notice: Subject to any disclaimer, the term of this patent is extended or adjusted under 35 U.S.C. 154(b) by 0 days.

(21) Appl. No.: 09/574,075

(22) Filed: May 18, 2000

(30) Foreign Application Priority Data

Oct. 14, 1999 (JP) .................................................. 11-292887

(51) Int. Cl.7 ................................ C08K 5/34; C08L 41/00
(52) U.S. Cl. ............................ 524/99; 524/547; 428/418
(58) Field of Search .............................. 428/418; 524/99, 524/547

(56) References Cited

FOREIGN PATENT DOCUMENTS

| | | |
|---|---|---|
| 1286460 | 8/1972 | (GB) . |
| 1526398 | 9/1978 | (GB) . |
| 965861995 | 7/1988 | (JP) . |
| WO9724023 | 7/1997 | (WO) . |

Primary Examiner—Kriellion Sanders
(74) Attorney, Agent, or Firm—Saul R. Bresch

(57) ABSTRACT

A moisture curable polyolefin composition comprising:

(a) a polyolefin, and for each 100 parts by weight of component (a), (b) 0.1 to 10 parts by weight of an unsaturated alkoxy silane;

(c) 0.01 to 2 parts by weight of an organic peroxide;

(d) 0.01 to 2 parts by weight of a silanol condensation catalyst;

(e) 0.02 to 2 parts by weight of a hindered amine stabilizer;

(f) 0.01 to 1 part by weight of a hindered phenol antioxidant; and (g) 0.01 to 1 part by weight of an arylamine antioxidant.

6 Claims, No Drawings

MOISTURE CURABLE POLYOLEFIN COMPOSITIONS

TECHNICAL FIELD

This invention relates to moisture curable polyolefin compositions and a masterbatch type composition therefor.

BACKGROUND INFORMATION

Polyolefins, particularly polyethylene, can be crosslinked by first making the resin hydrolyzable, which is accomplished by adding hydrolyzable groups to the resin structure through copolymerization or grafting. For example, ethylene can be copolymerized with an ethylenically unsaturated compound having one or more —Si(OR)$_3$ groups wherein R is a hydrocarbyl radical or the silane compound can be grafted to the resin in the presence of an organic peroxide. The hydrolyzable resins are then crosslinked by moisture in the presence of a silanol condensation catalyst.

The moisture curable polyethylene can be prepared by a single step process, which typically involves introducing all of the components, i.e., the resin, usually in the form of pellets; the unsaturated alkoxysilane; an organic peroxide; a silanol condensation catalyst; an antioxidant; and other additives, into an extruder; mixing the components together; heating until the hydrolyzable group is grafted to the resin; and extruding a molded product, such as a pellet, through the die.

Unfortunately, many of the present moisture curable resin compositions, when converted to typical end products such as power cable insulation, jacketing or semiconducting shields, suffer from inferior heat endurance, poor thermal aging resistance, and yellowing

DISCLOSURE OF THE INVENTION

An object of this invention, therefore, is to provide a moisture curable polyolefin composition, which, when converted to various end products, evinces much improved heat endurance, thermal aging resistance, and resistance to yellowing.

According to the invention, a moisture curable polyolefin composition has been discovered which meets the above object.

The composition comprises
(a) a polyolefin, and for each 100 parts by weight of component (a),
(b) 0.1 to 10 parts by weight of an unsaturated alkoxy silane;
(c) 0.01 to 2 parts by weight of an organic peroxide;
(d) 0.01 to 2 parts by weight of a silanol condensation catalyst;
(e) 0.02 to 2 parts by weight of a hindered amine stabilizer;
(f) 0.01 to 1 part by weight of a hindered phenol antioxidant; and
(g) 0.01 to 1 part by weight of an arylamine antioxidant.

In another embodiment of the invention, components (b) to (g) are combined in masterbatch form. This unsaturated alkoxy silane composition is found to have a high level of storage stability.

The composition comprises:
(a) an unsaturated alkoxy silane, and for each 100 parts by weight of component (a),
(b) 0.1 to 10 parts by weight of an organic peroxide;
(c) 0.1 to 10 parts by weight of a silanol condensation catalyst;
(d) 0.02 to 10 parts by weight of a hindered amine stabilizer;
(e) 0.01 to 10 parts by weight of a hindered phenol antioxidant; and
(f) 0.01 to 10 parts by weight of an arylamine antioxidant.

Finally, another embodiment of the invention displays the moisture curable composition in two parts, the first being the polyolefin portion and the second being the unsaturated alkoxy silane portion. The composition comprises:
(i) a polyolefin, and for each 100 parts by weight of component (i),
(ii) 0.2 to 20 parts by weight of an unsaturated alkoxy silane, and for each 100 parts by weight of component (ii),
(a) 0.1 to 10 parts by weight of an organic peroxide;
(b) 0.1 to 10 parts by weight of a silanol condensation catalyst;
(c) 0.02 to 10 parts by weight of a hindered amine stabilizer;
(d) 0.01 to 10 parts by weight of a hindered phenol antioxidant; and
(e) 0.01 to 10 parts by weight of an arylamine antioxidant.

DESCRIPTION OF THE PREFERRED EMBODIMENT(S)

Polyolefin, as that term is used herein, is a thermoplastic resin, which is crosslinkable. It can be a homopolymer or a copolymer produced from two or more comonomers, or a blend of two or more of these polymers, conventionally used in film, sheet, and tubing, and as jacketing and/or insulating materials in wire and cable applications. The polymers can be crystalline, amorphous, or combinations thereof. They can also be block or random copolymers. The monomers useful in the production of these homopolymers and copolymers can have 2 to 20 carbon atoms, and preferably have 2 to 12 carbon atoms. Examples of these monomers are alpha-olefins such as ethylene, propylene, 1-butene, 1-hexene, 4-methyl-i-pentene, and 1-octene; unsaturated esters such as vinyl acetate, ethyl acrylate, methyl acrylate, methyl methacrylate, t-butyl acrylate, n-butyl acrylate, n-butyl methacrylate, 2-ethylhexyl acrylate, and other alkyl acrylates; diolefins such as 1,4-pentadiene, 1,3-hexadiene, 1,5-hexadiene, 1,4-octadiene, and ethylidene norbornene, commonly the third monomer in a terpolymer; other monomers such as styrene, p-methyl styrene, alpha-methyl styrene, p-chloro styrene, vinyl naphthalene, and similar aryl olefins; nitriles such as acrylonitrile, methacrylonitrile, and alpha-chloroacrylonitrile; vinyl methyl ketone, vinyl methyl ether, vinylidene chloride, maleic anhydride, vinyl chloride, vinylidene chloride, vinyl alcohol, tetrafluoroethylene, and chlorotri-fluoroethylene; and acrylic acid, methacrylic acid, and other similar unsaturated acids.

The homopolymers and copolymers referred to can be non-halogenated, or halogenated in a conventional manner, generally with chlorine or bromine. Examples of halogenated polymers are polyvinyl chloride, polyvinylidene chloride, and polytetra-fluoroethylene. The homopolymers and copolymers of ethylene and propylene are preferred, both in the non-halogenated and halogenated form. Included in this preferred group are terpolymers such as ethylene/propylene/diene monomer rubbers.

With respect to polypropylene: homopolymers and copolymers of propylene and one or more other alpha-olefins wherein the portion of the copolymer based on propylene is at least about 60 percent by weight based on the weight of the copolymer can be used to provide the polyolefin of the invention. Polypropylene can be prepared by conventional processes such as the process described in U.S. Pat. No. 4,414,132. Preferred polypropylene alpha-olefin comonomers are those having 2 or 4 to 12 carbon atoms.

Polyethylene, as that term is used herein, is a homopolymer of ethylene or a copolymer of ethylene and a minor proportion of one or more alpha-olefins having 3 to 12 carbon atoms, and preferably 4 to 8 carbon atoms, and, optionally, a diene, or a mixture or blend of such homopolymers and copolymers. The mixture can be a mechanical blend or an in situ blend. Examples of the alpha-olefins are propylene, 1-butene, 1-hexene, 4-methyl-1-pentene, and 1-octene. The polyethylene can also be a copolymer of ethylene and an unsaturated ester such as a vinyl ester, e.g., vinyl acetate or an acrylic or methacrylic acid ester.

The polyethylene can be homogeneous or heterogeneous. The homogeneous polyethylenes usually have a polydispersity (Mw/Mn) in the range of about 1.5 to about 3.5 and an essentially uniform comonomer distribution, and are characterized by single and relatively low DSC melting points. The heterogeneous polyethylenes, on the other hand, have a polydispersity (Mw/Mn) greater than 3.5 and do not have a uniform comonomer distribution. Mw is defined as weight average molecular weight and Mn is defined as number average molecular weight. The polyethylenes can have a density in the range of 0.860 to 0.950 gram per cubic centimeter, and preferably have a density in the range of 0.910 to about 0.930 gram per cubic centimeter. They also can have a melt index in the range of about 0.1 to about 50 grams per 10 minutes, preferably 0.5 to 10 grams per 10 minutes. A granular polyethylene is also preferable.

The polyethylenes can be produced by low or high pressure processes. They are preferably produced in the gas phase, but they can also be produced in the liquid phase in solutions or slurries by conventional techniques. Low pressure processes are typically run at pressures below 1000 psi whereas high pressure processes are typically run at pressures above 15,000 psi.

Typical catalyst systems, which can be used to prepare these polyethylenes, are magnesium/titanium based catalyst systems, which can be exemplified by the catalyst system described in U.S. Pat. No. 4,302,565 (heterogeneous polyethylenes); vanadium based catalyst systems such as those described in U.S. Pat. No. 4,508,842 (heterogeneous polyethylenes) and U.S. Pat. Nos. 5,332,793; 5,342,907; and 5,410,003 (homogeneous polyethylenes); a chromium based catalyst system such as that described in U.S. Pat. No. 4,101,445; a metallocene catalyst system such as those described in U.S. Pat. Nos. 4,937,299, 5,272,236, 5,278,272, and 5,317,036 (homogeneous polyethylenes); or other transition metal catalyst systems. Many of these catalyst systems are often referred to as Ziegler-Natta catalyst systems or Phillips catalyst systems. Catalyst systems, which use chromium or molybdenum oxides on silica-alumina supports, can be included here. Typical processes for preparing the polyethylenes are also described in the aforementioned patents. Typical in situ polyethylene blends and processes and catalyst systems for providing same are described in U.S. Pat. Nos. 5,371,145 and 5,405,901. The various polyethylenes can include low density homopolymers of ethylene made by high pressure processes (HP-LDPEs), linear low density polyethylenes (LLDPEs), very low density polyethylenes (VLDPEs), medium density polyethylenes (MDPEs), high density polyethylene (HDPE) having a density greater than 0.940 gram per cubic centimeter, and metallocene copolymers with densities less than 0.900 gram per cubic centimeter. The latter five polyethylenes are generally made by low pressure processes. A conventional high pressure process is described in Introduction to Polymer Chemistry, Stille, Wiley and Sons, New York, 1962, pages 149 to 151. The high pressure processes are typically free radical initiated polymerizations conducted in a tubular reactor or a stirred autoclave. In the stirred autoclave, the pressure is in the range of about 10,000 to 30,000 psi and the temperature is in the range of about 175 to about 250 degrees C, and in the tubular reactor, the pressure is in the range of about 25,000 to about 45,000 psi and the temperature is in the range of about 200 to about 350 degrees C. Blends of high pressure polyethylene and metallocene resins are particularly suited for use in the application, the former component for its excellent processability and the latter for its flexibility.

Copolymers comprised of ethylene and unsaturated esters are well known, and can be prepared by the conventional high pressure techniques described above. The unsaturated esters can be alkyl acrylates, alkyl methacrylates, and vinyl carboxylates. The alkyl group can have 1 to 8 carbon atoms and preferably has 1 to 4 carbon atoms. The carboxylate group can have 2 to 8 carbon atoms and preferably has 2 to 5 carbon atoms, The portion of the copolymer attributed to the ester comonomer can be in the range of about 5 to about 50 percent by weight based on the weight of the copolymer, and is preferably in the range of about 15 to about 40 percent by weight. Examples of the acrylates and methacrylates are ethyl acrylate, methyl acrylate, methyl methacrylate, t-butyl acrylate, n-butyl acrylate, n-butyl methacrylate, and 2-ethylhexyl acrylate. Examples of the vinyl carboxylates are vinyl acetate, vinyl propionate, and vinyl butanoate. The melt index of the ethylene/unsaturated ester copolymers can be in the range of about 0.5 to about 50 grams per 10 minutes, and is preferably in the range of about 2 to about 25 grams per 10 minutes. One process for the preparation of a copolymer of ethylene and an unsaturated ester is described in U.S. Pat. No. 3,334,081.

The VLDPE can be a copolymer of ethylene and one or more alpha-olefins having 3 to 12 carbon atoms and preferably 3 to 8 carbon atoms. The density of the VLDPE can be in the range of 0.870 to 0.915 gram per cubic centimeter. It can be produced, for example, in the presence of (i) a catalyst containing chromium and titanium, (ii) a catalyst containing magnesium, titanium, a halogen, and an electron donor; or (iii) a catalyst containing vanadium, an electron donor, an alkyl aluminum halide modifier, and a halocarbon promoter. Catalysts and processes for making the VLDPE are described, respectively, in U.S. Pat. Nos. 4,101,445; 4,302,565; and 4,508,842. The melt index of the VLDPE can be in the range of about 0.1 to about 20 grams per 10 minutes and is preferably in the range of about 0.3 to about 5 grams per 10 minutes. The portion of the VLDPE attributed to the comonomer(s), other than ethylene, can be in the range of about 1 to about 49 percent by weight based on the weight of the copolymer and is preferably in the range of about 15 to about 40 percent by weight. A third comonomer can be included, e.g., another alpha-olefin or a diene such as ethylidene norbornene, butadiene, 1,4-hexadiene, or a dicyclopentadiene. Ethylene/propylene copolymers and ethylene/propylene/diene terpolymers are generally referred to as EPRs and the terpolymer is generally referred to as an EPDM. The third comonomer can be present in an amount of about 1 to 15 percent by weight based on the weight of the copolymer and is preferably present in an amount of about 1 to about 10 percent by weight. It is preferred that the copolymer contain two or three comonomers inclusive of ethylene.

The LLDPE can include the VLDPE and MDPE, which are also linear, but, generally, has a density in the range of 0.916 to 0.925 gram per cubic centimeter. It can be a copolymer of ethylene and one or more alpha-olefins having 3 to 12 carbon atoms, and preferably 3 to 8 carbon atoms. The melt index can be in the range of about 1 to about 20 grams per 10 minutes, and is preferably in the range of about 3 to about 8 grams per 10 minutes. The alpha-olefins can be the same as those mentioned above, and the catalysts and processes are also the same subject to variations necessary to obtain the desired densities and melt indices.

As noted, included in the definition of polyethylene are homopolymers of ethylene made by a conventional high pressure process. The homopolymer preferably has a density in the range of 0.910 to 0.930 gram per cubic centimeter. The homopolymer can also have a melt index in the range of about 1 to about 5 grams per 10 minutes, and preferably has a melt index in the range of about 0.75 to about 3 grams per 10 minutes. Melt index is determined under ASTM D-1238, Condition E. It is measured at 190 degrees C and 2160 grams.

The unsaturated alkoxy silane can be a compound represented by the general formula $RR'SiY_2$ wherein R represents an aliphatic unsaturated hydrocarbon group or hydrocarbon oxy group which is reactive with the free radical site generated in a polyolefin. Examples of this group are vinyl, allyl, butenyl, cyclohexenyl, cyclopentadienyl. Y represents an alkoxy group such as methoxy, ethoxy, or butoxy. R' represents a saturated monovalent hydrocarbon, Y, or hydrogen. Each Y can be the same or different.

Examples of the unsaturated alkoxy silane are gamma-methacryloyloxypropyl trimethoxy silane; gamma-methacryloxypropyl triethoxy silane; gamma-methacryloxypropyl-tris-(2-methoxyethoxy) silane; vinyl-tris-methoxyethoxy) silane; vinyl trimethoxy silane; vinyl methyldimethoxy silane; vinyl triethoxy silane; vinyl triacetoxy silane; allyl triethoxy silane; allyl methyldiethoxy silane; diallyl dimethoxy silane; allyl phenyl diethoxy silane; methoxy vinyl diphenyl silane; dodecenyl dipropoxy silane; didecenyl dimethoxy silane; didodecenyl methoxy silane; cyclohexynyl trimethoxy silane; hexanyl hexoxy-dimethoxy silane; vinyl-tri-n-butoxy silane; hexenyl-tri-n-butoxy silane; hexenyl-tri-n-butoxy silane; vinyl-tris(n-butoxy) silane, vinyl-tris(n-pentoxy) silane, vinyl-tris(n-hexoxy) silane; vinyl-tris(n-heptoxy) silane; vinyl-tris(n-octoxy) silane; vinyl-tris(n-dodecyloxy) silane; vinyl-bis(n-butoxy)methyl silane; vinyl-bis(n-pentoxy)methyl silane; vinyl-bis(n-hexoxy)methyl silane; vinyl-(n-butoxy) dimethyl silane; vinyl-(n-pentoxy)dimethyl silane; allyl dipentoxy silane; butenyl didekoxy silane; decenyl didekoxy silane; dodecenyl trioctoxy silane; heptenyl triheptoxy silane; allyl tripropoxy silane; divinyl diethoxy silane; diallyl-di-n-butoxy silane; pentenyl tripropoxy silane; allyl-di-n-butoxy silane; sec-butenyl-triethoxy silane; p-methacryloxyethyl-tris(n-butoxy) silane; gamma-methacryloxyethyl-tris(n-butoxy) silane; and gamma-methacryloxy-propyl-tris(n-dodecyl) silane The organic peroxide is a compound, which forms a free radical site in a polyolefin under thermal conditions and can possess a half-life period shorter than 6 minutes, preferably shorter than 1 minute, at the reaction temperature. Examples of the organic peroxide are dicumyl peroxide; di-tert butyl peroxide; benzoyl peroxide; 2,5-di-(peroxybenzoate) hexyne-3; dichlorobenzoyl peroxide; 1,4-bis(t-butyl peroxyisopropyl)benzene; lauroyl peroxide; t-butyl peracetate; 2,5-dimethyl-2,5-di(t-butylperoxy)hexyne-3;2,5-dimethyl-2,5-di(t-butylperoxy)hexane; t-butyl perbenzoate; t-butyl perphenylacetate; t-butyl perisobutylate; t-butyl per-s-octate; t-butyl perpivalate; cumyl perpivalate; and t-butyl perdiethylacetate.

The silanol condensation catalyst can be any of the catalysts which are capable of promoting the water cure. Examples are dibutyl tin dilaurate, dibutyl tin diacetate, dibutyl tin dioleate, stannous acetate, lead naphthenate, cobalt naphthenate, zinc caprylate, iron 2-ethylhexanoate, titanic esters, titanic tetrabutyl esters, titanic tetranonyl esters, bis(acetylaceto-nitrile) di-isopropyl titanium, ethyl amine, hexyl amine, dibutyl amine, and pyridine.

Three types of stabilizers are used to accomplish the advantageous results of the composition of the invention, i.e., a hindered amine stabilizer; a hindered phenol antioxidant; and an arylamine antioxidant. One or more of each can be used in each moisture curable polyolefin composition.

The hindered amine stabilizer can be exemplified by the following general formula

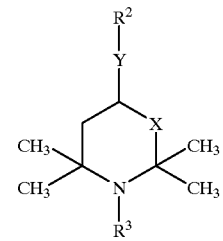

wherein X is $CH_2$ or a carbonyl group;
Y is $NR^4$;
$R^4$ is $(R^5)_jW$;
$R^5$ is a divalent alkylene group having 1 to 10 carbon atoms;
j=0 or 1; and
W is hydrogen or a bond to a piperidine to form a polymer;
$R^3$ is $(R^6)_jW$;
$R^6$ is oxygen, $—OC_nH_{2n}—$, or a linear or branched divalent alkylene group having 1 to 10 carbon atoms, n=an integer from 1 to 12, and W is as above; and
$R^2$ is selected from the group consisting of
(a) a divalent group having the formula $—(C=O)—C_mH_{2m+1}—(C=O)Z$ wherein m=an integer from 2 to 8, and Z is a heteroatom or a bond to another piperidine to form a polymer together with a bond to a heterocyclic structure or W, and W is as above;
(b) a bond to the $R^4$ group of another piperidine to form a polymer;
(c) where Y is $NR^4$, a triazine ring having a heteroatom, which could be bound or could make a bond to a piperidine to form a polymer; and
(d) a group having the formula $—(C_pH_{2p+1})—Si(CH_3)_qO_{(3-q)/2}$ wherein p=an integer from 0 to 8; q=an integer from 0 to 2, and a silicon atom is bound to an alkyl group having 1 to 18 carbon atoms through the (3–q) oxygen atom or to a silicon atom in the same heterocyclic ring or to another silicon atom, which is the silicon atom of $Si(CH_3)_rO_{4-r}$ wherein r=an integer from 0 to 3.

Examples of preferred hindered amine stabilizers are succinic acid dimethyl-1-(2-hydroxyethyl)-4-hydroxy-2,2,6, 6-tetramethylpiperidine polycondensate; poly[{6-(1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imino}]; and N,N'-bis(3-aminoprppyl)ethylenediamine-2,4-bis [N-butyl-N-(1,2,2,6, 6-pentamethyl-4-piperidyl)amino-6-chloro-1,3,5-triazine condensate.

The hindered phenol antioxidants include, for example, tetrakis[methylene-3-(3,5-di-tert-butyl-4-hydroxyphenyl)

propionate] methane; n-octadecyl-3-(3,5-di-tert-butyl-4-hydroxyphenyl) propionate; dibutylhydroxy toluene; butyric acid 3,3-bis(3-tert-butyl-4-hydroxyphenyl) ethylene ester; 1,3,5-tris(4-tert-butyl-2-hydroxy-2,6-dimethylbenzyl) isocyanuric acid; 3,9-bis [2-(3-tert-butyl-4hydroxy-5-methylphenyl) propionyloxy)-1,1-dimethylethyl]-2,4,8,10-tetraoxa-spiro[55] undecane; 2-tert-butyl-6-(3-tert-butyl-5-methyl-2-hydroxybenzyl)-4-methylphenyl acrylate; 4,4'-thiobis(3-methyl-6-tert-butylphenol); 2,2-thio-diethylene-bis[3-(3,5-di-tert-butyl-4-hydroxyphenyl)propionate]; tetrakis[methylene-3-(3', 5'-di-t-butyl-4'-hydroxyphenyl) propionate]methane; 1,3,5-trimethyl-2,4,6-tris(3,5-di-t-butyl-4-hydroxybenzyl)benzene; and 4,4-methylene-bis(3, 5-di-t-butylphenol).

The arylamine antioxidants can be exemplified by 4,4'-bis(a,a'-dimethylbenzyl)diphenylamine; 4,4'-dioctyldiphenylamine; phenyl-1-naphthylamine; N,N'-di-2-naphthyl-p-phenylenediamine; N,N'-diphenyl-p-phenylenediamine; N-phenyl-N'-isopropyl-p-phenylenediamine; N-phenyl-N'-(1,3,-dimethylbutyl)-p-phenylenediamine; and N-phenyl-N'-(3-methacryloyloxy-2-hydroxypropyl)-p-phenylendiamine. Among these arylamines, 4,4'-bis(a,a'-dimethylbenzyl)diphenylamine is preferred. In general, any secondary amine can be used, and the aryl group bound thereto can have a substituent group.

Optionally, a polyol or a partial ester of a polyol and a fatty acid can be and is preferably included in the composition of the invention. One or more of these compounds can be used in the composition. Examples are glycerin, trimethylolethane, trimethylolpropane, erythritol, pentaerythritol, dipentaerythritol, tripentaerythritol, xylitol, sorbitol, mannitol, and partial esters of polyol with fatty acid such as mono-ester of glycerin and fatty acid, mono-ester of sorbitan and fatty acid, mono-ester of sucrose and fatty acid, mono- or di-ester of pentaerythritol and fatty acid, mono-ester of trimethylolpropane and fatty acid, mono-ester of polyoxyethyleneglycerin and fatty acid, and mono-ester of polyoxyethylenesorbitan and fatty acid. Examples of the fatty acids are lauric acid, myristic acid, stearic acid, behenic acid, and oleic acid. Trimethylolethane and trimethylolpropane are preferred.

The amounts of various components in parts by weight are about as follows:

| component | parts per 100 parts of polyolefin | parts per 100 parts by weight of unsaturated alkoxy silane |
| --- | --- | --- |
| unsaturated alkoxy silane | 0.1 to 10, preferably 0.5 to 5 | — |
| organic peroxide | 0.01 to 2, preferably 0.02 to 1 | 0.1 to 10, preferably 1 to 8 |
| silanol condensation catalyst | 0.01 to 2, preferably 0.02 to 1 | 0.1 to 10, preferably 1 to 8 |
| hindered amine | 0.02 to 2, preferably 0.02 to 1 | 0.02 to 10, preferably 2 to 10 |
| hindered phenol | 0.01 to 1, preferably 0.01 to 0.5 | 0.01 to 10, preferably 1 to 8 |
| arylamine | 0.01 to 1, preferably 0.01 to 0.5 | 0.01 to 10, preferably 1 to 8 |
| optional: polyol or partial ester of polyol with fatty acid | 0.005 to 1, preferably 0.01 to 0.5 | 0.01 to 5, preferably 0.5 to 4 |

Conventional additives, which can be introduced into the composition, are exemplified by coupling agents, antistatic agents, pigments, dyes, nucleating agents, reinforcing fillers or polymer additives, slip agents, plasticizers, processing aids, lubricants, viscosity control agents, tackifiers, antiblocking agents, surfactants, extender oils, metal deactivators, voltage stabilizers, flame retardant fillers and additives including inorganic and organic additives such as polymer additives, crosslinking agents, boosters, and catalysts, and smoke suppressants. Additives and fillers can be added in amounts ranging from less than about 0.1 to more than about 50 percent by weight based on the weight of the composition.

Polymer additives can be high pressure, low density polyethylene; high density polyethylene; polypropylene; polybutene-1; ethylene/vinyl acetate or ethyl acrylate copolymers; ionomers; or ethylene/propylene copolymer or terpolymer rubbers.

The moisture curable polyolefin composition can be prepared by introducing the composition into an extruder, thoroughly mixing it in the first portion of the barrel of the extruder (at temperatures of 40 to 80 degrees C, preferably 55 to 65 degrees C) and then heating (generally at at least about 117 degrees C) in the next portion of the barrel of the extruder to melt the polyolefin composition, decompose the organic peroxide to generate free radicals, and graft the unsaturated alkoxy silane to the polyolefin. Alternatively, the unsaturated alkoxy silane composition can be prepared first by mixing the components together, and this composition can be introduced into the extruder with the polyolefin, and the process completed as above. The silane composition can also be soaked into the polyolefin prior to introduction into the extruder. The composition is preferably kneaded in the molten state at about 150 to 300 degrees C, preferably 180 to 270 degrees C, to accomplish the grafting. The grafted polyolefin composition, which contains the silanol condensation catalyst and the stabilizers, is then blended with other additives, if desired, in the last portion of the barrel of the extruder, and the blend is extrusion molded through the die of the extruder into a formed article. The formed moisture curable composition is then brought into contact with water in the form of a liquid or steam to be cured.

Various types of melt/mixers and extruders such as a Brabender™ mixer, Banbury™ mixer, a roll mill, a Buss™ co-kneader, a biaxial screw kneading extruder, and single or twin screw extruders can be used for mixing, grafting, and molding or extruding. A description of a conventional extruder can be found in U.S. Pat. No. 4,857,600. In addition to melt/mixing, the extruder can coat a wire or a core of wires. An example of co-extrusion and an extruder therefor can be found in U.S. Pat. No. 5,575,965. A typical extruder has a hopper at its upstream end and a die at its downstream end. The hopper feeds into a barrel, which contains a screw. At the downstream end, between the end of the screw and the die, is a screen pack and a breaker plate. The screw portion of the extruder is considered to be divided up into three sections, the feed section, the compression section, and the metering section, and two zones, the back heat zone and the front heat zone, the sections and zones running from upstream to downstream. In the alternative, there can be multiple heating zones (more than two) along the axis running from upstream to downstream. If it has more than one barrel, the barrels are connected in series. The length to diameter ratio of each barrel is in the range of about 15:1 to about 30:1, preferably more than about 18:1. In wire coating, where the material is crosslinked after extrusion, the die of the crosshead feeds directly into a heating zone, and this zone can be maintained at a temperature in the range of about 130° C. to about 260° C., and preferably in the range of about 170° C. to about 220° C. In the present case, the coated wire is fed into a curing zone where it is exposed to moisture, for example, in the form of a bath, and cured. Here, the curing zone is maintained at a temperature in the range of about room temperature to about 200 degrees C, preferably 60 to 100 degrees C, and the curing is effected for a period of about 10 seconds to about 10 days, preferably about 1 minute to about 1 day. Curing can also take place in steam for 2 to 5 hours or more.

As noted above, the moisture curable polyolefin composition can be used to provide the insulating, jacketing, and/or semiconducting layers of a cable such as a power cable. It can also be used to provide pipe, hose, tubing, sheet, film, tape, automobile parts, electronic parts, mechanical parts, and sporting goods, for example.

A typical electric power cable generally comprises one or more conductors in a cable core that is surrounded by several layers of polymeric materials including a first semiconducting shield layer (conductor or strand shield), an insulating layer, a second semiconducting shield layer (insulation shield), a metallic tape or wire shield, and a protective jacket. The outer semiconducting shield can be either bonded to the insulation or strippable, with most applications using strippable shields. Additional layers within this construction such as moisture impervious materials are often incorporated.

The term "surrounded" as it applies to a substrate being surrounded by an insulating composition, jacketing material, or other cable layer is considered to include extruding around the substrate; coating the substrate; or wrapping around the substrate as is well known by those skilled in the art. The substrate can include, for example, a core including a conductor or a bundle of conductors, or various underlying cable layers as noted above. For example, a cable comprising a conductive substrate such as copper wire or glass fiber surrounded by one or more layers comprising (a) a crosslinked polyolefin grafted with 0.1 to 10 parts by weight of an unsaturated alkoxy silane based on 100 parts by weight of component (a), and for each 100 parts by weight of polyolefin,
(b) 0.02 to 2 parts by weight of a hindered amine stabilizer;
(c) 0.01 to 1 part by weight of a hindered phenol antioxidant; and
(d) 0.01 to 1 part by weight of an arylamine antioxidant.

The advantages of the invention are that the moisture curable polyolefin composition imparts in the end product much improved heat endurance, thermal aging resistance, and resistance to yellowing. The composition can, therefore, be advantageously used, therefore, for hot-water pipe, agricultural pipe, kitchen pipe, hose, sheet, film, steel pipe composites, steel plate composites, foamed product, tape, various formed articles, electronic parts, mechanical parts, and athletic goods. It is particularly useful in wire and cable applications. Also, the unsaturated alkoxy silane masterbatch type composition is found to be particularly stable in storage even under severe conditions. Thus, the silane composition can be pre-prepared rather than having to meter each of its components separately into a mixer or extruder.

All molecular weights mentioned in this specification are weight average molecular weights unless otherwise designated.

This specification is based on Japanese patent application 292887/1999 filed on Oct. 14, 1999. The inventors are Tsukada et al.

The patents and patent application mentioned in this specification are incorporated by reference herein.

The invention is illustrated by the following examples.

EXAMPLES 1 to 10

Evaluation Methods (1) Gel fraction (degree of cross-linking): It is determined in accordance with JIS (Japanese Industrial Standard) C3005. Gel fraction evaluates the degree of cross-linking. The higher the gel fraction, the higher the cross-linking, and the higher the heat endurance. Thus, gel fraction is an index of heat endurance.

(2) Tensile strength and elongation are determined in accordance with JIS K6301. The test specimen is 1 millimeter thick. It is a No. 3 dumbbell specimen with a drawing rate of 500 millimeters per minute.

3) Thermal aging resistance is determined in accordance with JIS K6723. The tensile strength and elongation determination of specimens before and after storage under specified conditions are carried out, and their residual percentages with respect to thermal aging are calculated by comparing with the results before storage. The thermal aging residual percentage means a lack of thermal stability if the value is low.

(4) Yellowing is determined in accordance with JIS K7103 by measuring color difference from the standard panel without irradiation of the molded article and with irradiation of the molded article of UV light. The conditions are 60 degrees C and 90 mv per square centimeter for 24 hours. Less yellowing is represented by lower values.

Components (1) Polyolefin resin (hereinafter referred as base resin) is a copolymer of ethylene and 1-butene having a melt mass flow rate of 0.7 gram per 10 minutes and a density of 0.920 gram per cubic centimeter.

(2) Unsaturated alkoxy silane compound (hereinafter referred as silane compound) is vinyltrimethoxysilane.

(3) Organic peroxide 1 is dicumyl peroxide.

Organic peroxide 2 is 2,5-dimethyl-2,5-di(t-butylperoxy) hexane.

(4) Silanol condensation catalyst (hereinafter referred as condensation catalyst) is dibutyltindilaurate (5) Hindered amine stabilizer (hereinafter referred as HAS)

HAS 1: succinic acid dimethyl-1-(2-hydroxyethyl)-4-hydroxy-2,2,6,6-tetramethylpiperidine polycondensate HAS 2: poly[{6-(1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imino}]

(6) Hindered phenol antioxidant (hereinafter referred as HPAO)

HPAO1:tetrakis[methylene-3-(3',5'-di-t-butyl-4'-hydroxyphenyl)propionate] methane HPAO2:2,2-thio-diethylenebis[3-(3,5-di-t-butyl-4-hydroxyphenyl)propionate]

HPAO 3:4,4'-thiobis(3-methyl-6-t-butylphenol)

HPAO4:1,3,5-trimethyl-2,4,6-tris(3,5-di-t-butyl-4-hydroxybenzyl)benzene (7) Arylamine antioxidant (hereinafter referred as AAAO)
AAAO: 4,4'-bis(a,a'-dimethylbenzyl)diphenylamine (8) Polyol or partial ester of said polyol with fatty acid (hereinafter referred as polyol) is trimethylolpropane (9) Other antioxidant
AO: tris[2-t-butyl-4-thio-(2'-methy-4'-hydroxy-5'-t-butyl)phenyl-5-methyl]phenylphosphite

EXAMPLE 1

Silane compound, organic peroxide 1, condensation catalyst, HAS 1, HPAO1, and AAAO are added to base resin preheated to 60 degrees C. The mixture is placed in a ribbon blender and mixed for 30 minutes at 60 degrees C, and allowed to stand for 2 hours in a closed container at 60 degrees C during which the components soak into the polyolefin. The mixture is then fed into a LABO PLASTOMILL™ extruder having a tape die 1 millimeter thick and 60 millimeters wide, and is extruded with a screw rotation speed of 35 rpm (revolutions per minute). The extruder has a temperature of 210 degrees C at the feed port, 220 degrees C at the compression port and the metering port, and 200 degrees C at the die. The tape shaped molded article is treated in an atmosphere of saturated steam at 100 degrees C for 3 hours, and a molded article is obtained. Variables are set forth in Table 1 and results in Table 2.

TABLE 1

(unit: parts by weight)

|  | Example 1 |
|---|---|
| Base resin 1 | 100 |
| Silane compound | 1.34 |
| Organic peroxide 1 | 0.07 |
| Condensation catalyst | 0.04 |
| HAS 1 | 0.08 |
| HPAO 1 | 0.07 |
| AAAO | 0.03 |

TABLE 2

| Before storage | Gel fraction (%) | 62.3 |
|---|---|---|
|  | Tensile strength (MPa) | 25.5 |
|  | Elongation (%) | 550 |
|  | Yellowing (before irradiation) | 3.5 |
|  | Yellowing (after irradiation) | 4.0 |
| After storage at 150° C. for 7 days | Gel fraction (%) | 61.7 |
|  | Residual percentage of tensile strength (%) | 102 |
|  | Residual percentage of elongation (%) | 105 |

Example 1 shows excellent gel fraction, tensile strength and elongation, and yellowing, even after the storage test. Thus, the polyolefin composition is superior in heat endurance, thermal aging, and yellowing resistance.

EXAMPLES 2 to 6

(1) Preparation of silane blend

TABLE 3

(unit: parts by weight)

|  | Ex. 2 | Ex. 3 | Ex. 4 | Ex. 5 | Ex. 6 |
|---|---|---|---|---|---|
| Silane compound | 100 | 100 | 100 | 100 | 100 |
| Organic peroxide 1 | 4.8 | 4.8 | 4.9 | 2.4 | 4.0 |
| Organic peroxide 2 | — | — | — | 1.2 | — |
| Condensation catalyst | 3.0 | 3.0 | 3.1 | 3.0 | 3.0 |
| HAS 1 | 6.1 | 6.1 | 6.1 | 6.1 | — |
| HAS 2 | — | — | — | — | 6.1 |
| HPAO 1 | 4.8 | 3.6 | 3.6 | 3.6 | — |
| HPAO 2 | — | — | — | — | 4.2 |

TABLE 3-continued (unit: parts by weight)

|  | Ex. 2 | Ex. 3 | Ex. 4 | Ex. 5 | Ex. 6 |
|---|---|---|---|---|---|
| AAAO | 2.4 | 3.6 | 3.7 | 3.6 | 3.2 |
| Polyol | — | — | 3.7 | 1.2 | — |

(2) Preparation of resin composition and molded articles

Each silane blend is placed in a closed container and stored for 7 days and 40 days in constant temperature at 50 degrees C. 1.6 parts by weight of each silane blend is added to 100 parts by weight of base resin preheated as in Example 1, and a molded article is obtained in the same manner as Example 1. Variables and results are set forth in Tables 4, 5, and 6. With respect to the silane blend, Table 5 covers 7 day storage and Table 6 covers 40 day storage

TABLE 4

(unit: parts by weight)

|  | Ex. 2 | Ex. 3 | Ex. 4 | Ex. 5 | Ex. 6 |
|---|---|---|---|---|---|
| Base resin 1 | 100 | 100 | 100 | 100 | 100 |
| Silane compound | 1.3 | 1.3 | 1.3 | 1.3 | 1.3 |
| Organic peroxide 1 | 0.07 | 0.07 | 0.07 | 0.03 | 0.05 |
| Organic peroxide 2 | — | — | — | 0.02 | — |
| Condensation catalyst | 0.04 | 0.04 | 0.04 | 0.04 | 0.04 |
| HAS 1 | 0.08 | 0.08 | 0.08 | 0.08 | — |
| HAS 2 | — | — | — | — | 0.08 |
| HPAO 1 | 0.07 | 0.05 | 0.05 | 0.05 | 0.06 |
| AAAO | 0.03 | 0.05 | 0.05 | 0.05 | 0.04 |
| Polyol | — | — | 0.02 | 0.02 | — |

TABLE 5

|  |  | Ex. 2 | Ex. 3 | Ex. 4 | Ex. 5 | Ex. 6 |
|---|---|---|---|---|---|---|
| Before storage | Gel fraction (%) | 56.0 | 55.7 | 54.9 | 55.0 | 56.8 |
|  | Tensile strength (MPa) | 21.8 | 22.1 | 22.0 | 23.7 | 24.0 |
|  | Elongation (%) | 550 | 560 | 610 | 610 | 590 |
|  | Yellowing (before irradiation) | 5.5 | 3.9 | 2.9 | 3.9 | 4.5 |
|  | Yellowing (after irradiation) | 9.5 | 8.7 | 7.9 | 9.5 | 6.8 |
| After storage at 150° C. for 7 days | Gel fraction (%) | 55.8 | 55.5 | 55.1 | 53.7 | 55.4 |
|  | Residual percentage of tensile strength (%) | 94 | 100 | 96 | 91 | 96 |
|  | Residual percentage of elongation (%) | 100 | 100 | 92 | 89 | 100 |

TABLE 6

|  |  | Ex. 2 | Ex. 3 | Ex. 4 | Ex. 5 | Ex. 6 |
|---|---|---|---|---|---|---|
| Before storage | Gel fraction (%) | 58.0 | 55.5 | 55.0 | 55.5 | 57.0 |
|  | Tensile strength (MPa) | 21.7 | 21.6 | 20.0 | 23.7 | 22.0 |
|  | Elongation (%) | 550 | 550 | 500 | 520 | 560 |
|  | Yellowing (before irradiation) | 3.7 | 3.7 | 2.5 | 1.6 | 4.5 |
|  | Yellowing (after irradiation) | 8.1 | 11.3 | 11.1 | 12.5 | 14.9 |
| After storage at 150° C. for 7 days | Gel fraction (%) | 55.8 | 55.5 | 56.4 | 54.1 | 56.4 |
|  | Residual percentage of tensile strength (%) | 94 | 94 | 97 | 91 | 96 |
|  | Residual percentage of elongation (%) | 100 | 100 | 92 | 89 | 100 |

Examples 2 to 6 show excellent grafting and silanol condensation reactions even after storage at 50 degrees C for 40 days. Further, the storage stability of the silane blend is confirmed.

In addition, the molded articles exhibit excellent gel fraction, tensile strength and elongation, and yellowing resistance even after aging the molded articles at 150 degrees C for 7 days. This shows the polyolefin compositions to be superior in heat endurance, thermal aging resistance, and yellowing resistance.

COMPARATIVE EXAMPLE 1

Example 2 is repeated except that HPAO 1 is substituted for the three stabilizer package. Variables and results are shown in Tables 7, 8, 9, and 10. With respect to the silane blend, Table 9 covers 7 day storage and Table 10 covers 40 day storage.

TABLE 7

(unit: parts by weight)

|  | Comparative example 1 |
|---|---|
| Silane compound | 100 |
| Organic peroxide 1 | 4.5 |
| Condensation catalyst | 3.2 |
| HPAO 1 | 9.4 |

TABLE 8

|  | Comparative example 1 |
|---|---|
| Base resin | 100 |
| Silane composition | 1.3 |

TABLE 8-continued

|  | Comparative example 1 |
|---|---|
| Organic peroxide 1 | 0.06 |
| Condensation catalyst | 0.04 |
| HPAO 1 | 0.13 |

TABLE 9

|  |  | Comparative example 1 |
|---|---|---|
| Before storage | Gel fraction (%) | 59.5 |
|  | Tensile strength (MPa) | 25.0 |
|  | Elongation (%) | 570 |
|  | Yellowing (before irradiation) | 1.1 |
|  | Yellowing (after irradiation) | 6.8 |
| After storage at 150° C. for 7 days | Gel fraction (%) | 59.2 |
|  | Residual percentage of tensile strength (%) | 100 |
|  | Residual percentage of elongation (%) | 100 |

TABLE 10

|  |  | Comparative example 1 |
|---|---|---|
| Before storage | Gel fraction (%) | 58.0 |
|  | Tensile strength (MPa) | 21.1 |
|  | Elongation (%) | 530 |
|  | Yellowing (before irradiation) | 2.8 |
|  | Yellowing (after irradiation) | 6.5 |
| After storage at 150° C. for 7 days | Gel fraction (%) | 57.2 |
|  | Residual percentage of tensile strength (%) | 23 |
|  | Residual percentage of elongation (%) | 12 |

Comparative example 1 shows good yellowing resistance, but the storage stability of the silane blend is inferior to the silane blend of the present invention, and thermal aging resistance of the molded article prepared from this silane blend after storage at 50 degrees C for 40 days (Table 10) is notably inferior. Thus, the HPAO 1 alone is not satisfactory.

COMPARATIVE EXAMPLES 2 to 4

In these comparative examples, a phosphorus-sulfur type antioxidant AO is tested. Example 2 is otherwise repeated. Variables and results are set forth in Tables 11 to 14. With respect to the silane blend, Table 13 covers 7 day storage and Table 14 covers 40 day storage.

TABLE 11

(unit: parts by weight)

|  | Comparative example 2 | Comparative example 3 | Comparative example 4 |
|---|---|---|---|
| Silane compound | 100 | 100 | 100 |
| Organic peroxide 1 | 6.4 | 3.7 | 7.5 |
| Condensation catalyst | 4.7 | 4.0 | 4.3 |
| HPAO 4 | 4.9 | 3.7 | — |
| AAAO | 5.7 | 4.5 | 6.6 |
| AO | 21.4 | 6.3 | 13.1 |

TABLE 12

(unit: parts by weight)

|  | Comparative example 2 | Comparative example 3 | Comparative example 4 |
|---|---|---|---|
| Base resin 1 | 100 | 100 | 100 |
| Silane compound | 1.1 | 1.3 | 1.2 |
| Organic peroxide 1 | 0.07 | 0.05 | 0.09 |
| Condensation catalyst | 0.05 | 0.05 | 0.05 |
| HPAO 4 | 0.06 | 0.05 | — |
| AAAO | 0.07 | 0.06 | 0.08 |
| AO | 0.24 | 0.08 | 0.16 |

TABLE 13

|  |  | Comp. example 2 | Comp. example 3 | Comp. example 4 |
|---|---|---|---|---|
| Before storage | Gel fraction (%) | 58.0 | 57.0 | 56.0 |
|  | Tensile strength (MPa) | 23.1 | 20.6 | 22.0 |
|  | Elongation (%) | 590 | 540 | 540 |
|  | Yellowing (before irradiation) | 10.5 | 9.0 | 6.7 |
|  | Yellowing (after irradiation) | 28.6 | 20.5 | 22.4 |
| After storage at 150° C. for 7 days | Gel fraction (%) | 57.7 | 62.5 | 55.5 |
|  | Residual percentage of tensile strength (%) | 80 | 95 | 98 |
|  | Residual percentage of elongation (%) | 82 | 92 | 95 |

TABLE 14

|  |  | Comp. example 2 | Comp. example 3 | Comp. example 4 |
|---|---|---|---|---|
| Before storage | Gel fraction (%) | 56.3 | 60.2 | 53.0 |
|  | Tensile strength (MPa) | 21.5 | 18.9 | 21.3 |
|  | Elongation (%) | 530 | 500 | 640 |
|  | Yellowing (before irradiation) | 9.8 | 7.5 | 6.3 |
|  | Yellowing (after irradiation) | 53.5 | 38.7 | 44.9 |
| After storage at 50° C. for 40 days | Gel fraction (%) | 56.0 | 59.7 | 53.8 |
|  | Residual percentage of tensile strength (%) | 90 | 100 | 100 |
|  | Residual percentage of elongation (%) | 100 | 100 | 97 |

Comparative examples 2 to 4 show good thermal aging resistance, but their yellowing resistance is inferior.

COMPARATIVE EXAMPLES 5 to 8

Two sets of silane blends are prepared as in Comparative example 1. One set of silane blends is placed in closed containers, and stored at 50 degrees C for 7 days. The other set is not stored. Molded articles are made in the same manner as above from the silane blends. Variables and results are set forth in Tables 15 to 18. With respect to the silane blends, Table 17 covers the blends, which have not been stored, and Table 18 covers the blends, which have been stored.

TABLE 15

(unit: parts by weight)

|  | Comp. example 5 | Comp. example 6 | Comp. example 7 | Comp. example 8 |
|---|---|---|---|---|
| Silane compound | 100 | 100 | 100 | 100 |
| Organic peroxide 1 | 4.3 | 4.3 | 4.3 | 4.3 |
| Condensation catalyst | 3.1 | 3.1 | 3.1 | 3.1 |
| HPAO 1 | 9.1 | 4.5 | — | 6.1 |
| HPAO 2 | — | 4.5 | 9.1 | — |
| HPAO 3 | — | — | — | 3.0 |

TABLE 16

(unit: parts by weight)

|  | Comp. example 5 | Comp. example 6 | Comp. example 7 | Comp. example 8 |
|---|---|---|---|---|
| Base resin | 100 | 100 | 100 | 100 |
| Silane compound | 1.4 | 1.4 | 1.4 | 1.4 |
| Organic peroxide 1 | 0.06 | 0.06 | 0.06 | 0.06 |
| Condensation catalyst | 0.04 | 0.04 | 0.04 | 0.04 |
| HPAO 1 | 0.13 | 0.06 | — | 0.08 |
| HPAO 2 | — | 0.06 | 0.13 | — |
| HPAO 3 | — | — | — | 0.04 |

TABLE 17

|  |  | Comp. example 5 | Comp. example 6 | Comp. example 7 | Comp. example 8 |
|---|---|---|---|---|---|
| Before storage | Gel fraction (%) | 58.0 | 54.8 | 54.5 | 41.2 |
|  | Tensile strength (MPa) | 19.8 | 20.5 | 20.7 | 21.4 |
|  | Elongation (%) | 480 | 510 | 490 | 580 |

TABLE 17-continued

|  |  | Comp. example 5 | Comp. example 6 | Comp. example 7 | Comp. example 8 |
|---|---|---|---|---|---|
| After storage at 150° C. for 7 days | Gel fraction (%) | 55.9 | 55.7 | 54.3 | 41.9 |
|  | Residual percentage of tensile strength (%) | 100 | 102 | 35 | 118 |
|  | Residual percentage of elongation | 99 | 98 | 7 | 99 |

Note: molded article obtained from silane blends, which have not been stored.

TABLE 18

|  |  | Comp. example 5 | Comp. example 6 | Comp. example 7 | Comp. example 8 |
|---|---|---|---|---|---|
| Before storage | Gel fraction (%) | 52.3 | 54.6 | 53.5 | 43.2 |
|  | Tensile strength (MPa) | 19.5 | 19.5 | 18.7 | 19.9 |
|  | Elongation (%) | 460 | 304 | 260 | 610 |
| After storage at 150° for 7 days | Gel fraction (%) | 51.0 | 56.4 | 55.5 | 44.7 |
|  | Residual percentage of tensile strength (%) | 23 | 35 | 38 | 26 |
|  | Residual percentage of elongation | 7 | 8 | 10 | 6 |

Note: molded articles obtained from silane blends, which have been stored..

COMPARATIVE EXAMPLES 9 and 10

Silane blends are prepared as in Comparative example 1, placed in closed containers, and stored at 50 degrees C for 40 days. Molded articles are then prepared as above. Variables and results are set forth in Tables 19 to 21.

TABLE 19

(unit: parts by weight)

|  | Comparative example 9 | Comparative example 10 |
|---|---|---|
| Silane compound | 100 | 100 |
| Organic peroxide 1 | 4.4 | 4.3 |
| Condensation catalyst | 3.2 | 3.1 |
| HAS 2 | — | 2.3 |
| HPAO 1 | 9.3 | 9.1 |
| Polyol | 2.4 | — |

TABLE 20

(unit: parts by weight)

|  | Comparative example 9 | Comparative example 10 |
|---|---|---|
| Base resin | 100 | 100 |
| Silane compound | 1.4 | 1.4 |
| Organic peroxide 1 | 0.06 | 0.06 |
| Condensation catalyst | 0.04 | 0.04 |
| HAS 2 | — | 0.03 |
| HPAO 1 | 0.13 | 0.13 |
| Polyol | 0.03 | — |

TABLE 21

|  |  | Comp. example 9 | Comp. example 10 |
|---|---|---|---|
| Before storage | Gel fraction (%) | 57.3 | 57.6 |
|  | Tensile strength (MPa) | 20.6 | 20.5 |
|  | Elongation (%) | 630 | 590 |
| After storage at 150° for 7 days | Gel fraction (%) | 59.7 | 57.8 |
|  | Residual percentage of tensile strength (%) | 28 | 51 |
|  | Residual percentage of elongation | 8 | 13 |

What is claimed is:

1. A moisture curable polyolefin composition comprising:
   (a) a polyolefin, and for each 100 parts by weight of component (a),
   (b) 0.1 to 10 parts by weight of an unsaturated alkoxy silane;
   (c) 0.01 to 2 parts by weight of an organic peroxide;
   (d) 0.01 to 2 parts by weight of a silanol condensation catalyst;
   (e) 0.02 to 2 parts by weight of a hindered amine stabilizer;
   (f) 0.01 to 1 part by weight of a hindered phenol antioxidant;
   (g) 0.01 to 1 part by weight of an arylamine antioxidant; and
   (h) 0.005 to 1 part by weight of a polyol or a partial ester of said polyol with a fatty acid.

2. The polyolefin composition defined in claim 1 wherein the polyolefin is polyethylene or a mixture of two or more different polyethylenes.

3. An unsaturated alkoxy silane composition comprising:
   (a) an unsaturated alkoxy silane, and for each 100 parts by weight of component (a),
   (b) 0.1 to 10 parts by weight of an organic peroxide;
   (c) 0.1 to 10 parts by weight of a silanol condensation catalyst;
   (d) 0.02 to 10 parts by weight of a hindered amine stabilizer;
   (e) 0.01 to 10 parts by weight of a hindered phenol antioxidant;
   (f) 0.01 to 10 parts by weight of an arylamine antioxidant; and (g) 0.01 to 5 parts by weight of a polyol or a partial ester of said polyol with a fatty acid based on 100 parts by weight of component (a) is included in the composition.

4. A moisture curable composition comprising:
(i) a polyolefin, and for each 100 parts by weight of component (i),
(ii) 0.2 to 20 parts by weight of an unsaturated alkoxy silane, and for each 100 parts by weight of component (ii),
   (a) 0.1 to 10 parts by weight of an organic peroxide;
   (b) 0.1 to 10 parts by weight of a silanol condensation catalyst;
   (c) 0.02 to 10 parts by weight of a hindered amine stabilizer;
   (d) 0.01 to 10 parts by weight of a hindered phenol antioxidant;
   (e) 0.01 to 10 parts by weight of an arylamine antioxidant; and
   (f) 0.01 to 5 parts by weight of a polyol or a partial ester of said polyol with a fatty acid.

5. The polyolefin composition defined in claim 4 wherein the polyolefin is polyethylene or a mixture of two or more different polyethylenes.

6. A cable comprising a conductive substrate surrounded by one or more layers comprising
   (a) a crosslinked polyolefin grafted with 0.1 to 10 parts by weight of an unsaturated alkoxy silane based on 100 parts by weight of component (a), and for each 100 parts by weight of polyolefin,
   (b) 0.02 to 2 parts by weight of a hindered amine stabilizer;
   (c) 0.01 to 1 part by weight of a hindered phenol antioxidant;
   (d) 0.01 to 1 part by weight of an arylamine antioxidant; and
   (e) 0.005 to 1 part by weight of a polyol or a partial ester of said polyol with a fatty acid.

* * * * *